(12) United States Patent
Fan et al.

(10) Patent No.: US 11,831,984 B2
(45) Date of Patent: Nov. 28, 2023

(54) CAMERA SHOOTING PROGRAM CONTROL METHOD, ELECTRONIC DEVICE, AND STORAGE MEDIUM

(71) Applicant: Beijing Xiaomi Mobile Software Co., Ltd., Beijing (CN)

(72) Inventors: Yongkang Fan, Beijing (CN); Suyue Liu, Beijing (CN); Xing Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 21 days.

(21) Appl. No.: 17/702,539

(22) Filed: Mar. 23, 2022

(65) Prior Publication Data

US 2023/0130129 A1   Apr. 27, 2023

(30) Foreign Application Priority Data

Oct. 25, 2021   (CN) .......................... 202111243021.2

(51) Int. Cl.
*H04N 23/667* (2023.01)
*G06F 3/041* (2006.01)
*H04N 23/63* (2023.01)

(52) U.S. Cl.
CPC ......... *H04N 23/667* (2023.01); *G06F 3/0418* (2013.01); *H04N 23/633* (2023.01)

(58) Field of Classification Search
CPC .... H04N 23/667; H04N 23/633; H04N 23/60; H04N 23/682; G06F 3/0418; G06F 1/1671; G06F 1/1686; G06F 1/1694; G06F 3/04883; G06F 3/04886; Y02D 30/70; H04M 1/724634; H04M 1/72454; H04M 2250/22; H04M 2250/52
See application file for complete search history.

(56) References Cited

U.S. PATENT DOCUMENTS

2013/0070112 A1* 3/2013 Yoshizawa ........... H04N 23/651
348/208.4
2022/0132023 A1* 4/2022 Kagaya ................ H04N 23/667

FOREIGN PATENT DOCUMENTS

| CN | 104049759 A | | 9/2014 |
| CN | 105376486 A | * | 3/2016 |
| CN | 107395901 A | | 11/2017 |

* cited by examiner

*Primary Examiner* — Ahmed A Berhan
(74) *Attorney, Agent, or Firm* — Volpe Koenig (57) ABSTRACT

A camera shooting program control method, the method is applied to terminal equipment, and the method includes obtaining motion parameters collected by at least one motion sensor in response to a situation that the terminal equipment enters a camera shooting program from a screen locking state, and determining a motion state of the terminal equipment according to the motion parameters collected by the at least one motion sensor; obtaining a mistaken touch rate of a display screen of the terminal equipment in response to the motion state of the terminal equipment being a moving state; and exiting the camera shooting program in response to a condition that the mistaken touch rate is greater than a preset first proportion threshold value.

17 Claims, 4 Drawing Sheets

CAMERA SHOOTING PROGRAM CONTROL METHOD, ELECTRONIC DEVICE, AND STORAGE MEDIUM

CROSS REFERENCE TO RELATED APPLICATION

The present application claims the benefit of priority to Chinese Application No. 2021112430212, filed on Oct. 25, 2021, the contents of which are incorporated herein by reference in their entireties for all purposes.

BACKGROUND

A smart phone and other terminal equipment have become an indispensable part in the life of people, and people seem to be inseparable from the smart phone and other terminal equipment in various scenes in life. When people do not use the terminal equipment, especially when the terminal equipment is carried to move, the terminal equipment can be switched to a screen locking state, so that a display screen is prevented from being touched by mistake.

SUMMARY

The disclosure relates to the technical field of camera shooting, in particular to a camera shooting program control method, an electronic device, and a storage medium.

According to a first aspect of the examples of the disclosure, provided is a camera shooting program control method, where the method is applied to terminal equipment, and includes:
  obtaining motion parameters collected by at least one motion sensor in response to a situation that the terminal equipment enters a camera shooting program from a screen locking state, and determining a motion state of the terminal equipment according to the motion parameters collected by the at least one motion sensor;
  obtaining a mistaken touch rate of a display screen of the terminal equipment in response to the fact that a motion state of the terminal equipment is a moving state, where the mistaken touch rate includes a proportion of a mistaken touch frequency of the display screen to a touch control frequency of the display screen, a touch control condition of a control in a picture of the display screen is a normal touch control, and a touch control condition of an area outside the control in the picture of the display screen is a mistaken touch; and
  exiting the camera shooting program in response to the condition that the mistaken touch rate is greater than a preset first proportion threshold value.

According to a second aspect of the examples of the disclosure, provided is an electronic device, including a memory and a processor, where the memory is configured to store computer instructions capable of running on the processor, and the processor is configured to execute the computer instructions on the basis of the camera shooting program control method in the first aspect.

According to a third aspect of the examples of the disclosure, provided is a non-transitory computer readable storage medium having a computer program stored, and when the program is executed by a processor, the camera shooting program control method in the first aspect is implemented.

BRIEF DESCRIPTION OF THE DRAWINGS

The drawings herein are incorporated into and constitute part of the description, illustrating examples conforming to the disclosure, and used together with the description to interpret the principles of the disclosure.

DETAILED DESCRIPTION

Illustrative examples will be described in detail here, examples of which are represented in the drawings. When the following description relates to drawings, the same numbers in different drawings represent the same or similar elements unless otherwise indicated. Examples described in the following illustrative examples do not represent all examples consistent with the disclosure. Instead, they are examples of devices and methods consistent with some aspects of the disclosure as detailed in the appended claims.

The terms used in the disclosure are intended to describe particular examples and are not intended to limit the disclosure. "a" "said" and "the" in a singular form used in the disclosure and the appended claims are also intended to include a plural form unless the context clearly represents other meanings. It should also be understood that the term "and/or" used herein refers to and includes any or all possible combinations of one or more associated listed items.

It should be understood that although the terms such as first, second, third, etc. may be employed in the disclosure to describe various information, this information should not be limited to these terms. These terms are used to distinguish a same type of information from each other. For example, without departing from the scope of the disclosure, first information may also be referred to as second information, similarly, the second information may also be referred to as the first information. Depending on the context, the word "if" as used herein may be interpreted as "when" or "while" or "in response to a determination".

A smart phone and other terminal equipment have become an indispensable part in the life of people, and people seem to be inseparable from the smart phone and other terminal equipment in various scenes in life. When people do not use the terminal equipment, for example, when the terminal equipment is carried to move, the terminal equipment can be switched to a screen locking state, so that a display screen is prevented from being touched by mistake. However, in order to meet the requirement of people for quickly starting a camera shooting program for photographing or camera shooting, a screen locking interface is provided with a camera shooting program starting key, when a user touches the key, an unlocking step can be skipped to directly enter the camera shooting program, but in the screen locking state, the key is mistakenly touched to enter the camera shooting program by mistake, and even further mistakenly shoot an image or record a video.

In one specific scene, after a user locks a screen of a smart phone, the smart phone is placed in a pocket of a clothes to walk, run or ride a bicycle, the display screen of the smart phone is in a screen locking interface, and the screen locking interface can be in contact with the skin of a human body across the clothes in the moving process of the user; when other positions of the screen locking interface are in contact with the skin of the human body, any operation cannot be triggered, however, when a camera shooting program starting key in the screen locking interface is in contact with the skin of the human body, mistaken touch occurs, so that a camera shooting program is entered, and further, after a key in a viewing interface in the camera shooting program is in contact with the skin, mistaken touch continues, so as to take a camera image or record a video by mistake, which not only occupies the memory of the mobile phone, even violates the privacy of the user, greatly reducing the use experience of the user.

Figure 1:
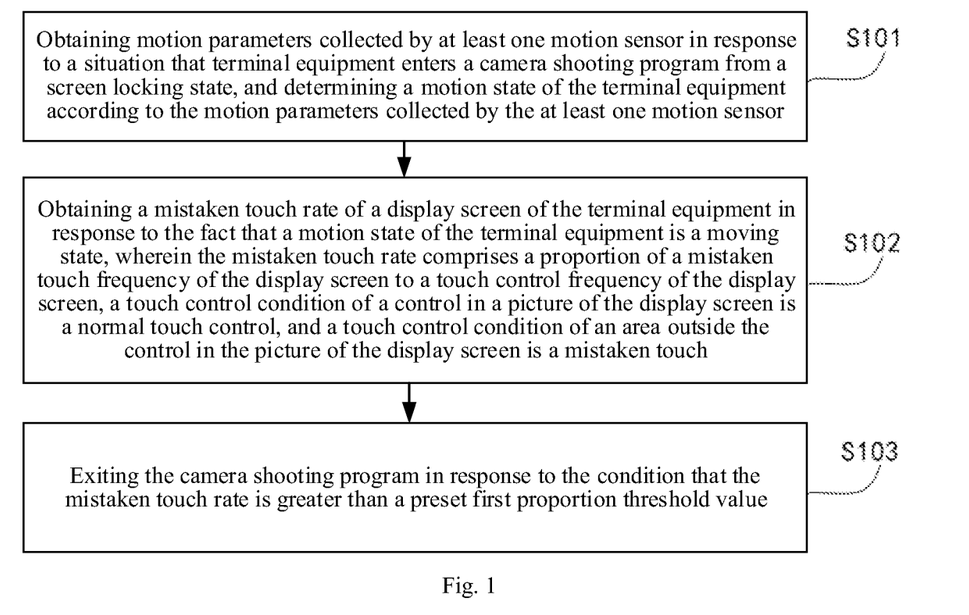
FIG. 1 is a flow chart of a camera shooting program control method shown in one illustrative example of the disclosure.

Based on this, in a first aspect, at least one example of the disclosure provides a camera shooting program control method, as shown in FIG. 1, showing a process of the method, and the method includes steps S101-S103.

The camera shooting program control method can be executed by an electronic device such as a terminal device or a server. The terminal device can be user equipment (UE), a mobile device, a user terminal, a terminal, a cellular telephone, a cordless telephone, a personal digital assistant (PDA) handheld device, a computing device, a vehicle-mounted device, a wearable device and the like, and the method can be implemented in a manner of calling a computer readable instruction stored in a memory through a processor.

In step S101, in response to a situation that terminal equipment enters a camera shooting program from a screen locking state, motion parameters collected by at least one motion sensor are obtained, and a motion state of the terminal equipment is determined according to the motion parameters collected by the at least one motion sensor.

When the terminal equipment is in a screen locking state, a display screen can display a screen locking interface, or when the terminal equipment is in the screen locking state, the display screen is always-on, namely the display screen is in a blank screen state, and if keys such as a screen locking key of the terminal equipment are operated at the moment, the display screen is lighted up and displays the screen locking interface. The screen locking interface is provided with a camera shooting program starting key, and the key is a shortcut key, that is, when a user touches the key, an unlocking step can be skipped to directly enter a camera shooting program.

The terminal equipment enters the camera shooting program from a screen locking state in which at least two conditions can exist. In a first condition, when a user needs to take a picture or record a video, the camera shooting program is directly started through a camera shooting program starting key in a screen locking interface; and in a second condition, when a user carries terminal equipment in a screen locking state to move, a camera shooting program starting key in a screen locking interface of the terminal equipment is mistakenly touched, so that the camera shooting program is mistakenly entered.

After entering the camera shooting program, a viewing interface can be presented, the viewing interface includes a viewing frame and various photographing control keys, such as a photographing mode control key, a flash lamp control key, a photographing determining key (commonly known as a shutter key) and the like, images collected by a camera of the terminal equipment are displayed in the viewing frame in real time, and after the various keys are touched, corresponding operations are triggered, for example, when the photographing determining key is touched, the terminal equipment shoots an image.

In one example, the motion sensor may be at least one of a gyroscope and an acceleration sensor. The gyroscope can detect a posture angle of the terminal equipment, and the acceleration sensor can detect acceleration of the terminal equipment. Through the at least one sensor, the motion state of the terminal equipment can be determined, for example, the terminal equipment is in a static state, a motion state and the like.

In the step S102, in response to the fact that a motion state of the terminal equipment is a moving state, a mistaken touch rate of a display screen of the terminal equipment is obtained, where the mistaken touch rate includes a proportion of a mistaken touch frequency of the display screen to a touch control frequency of the display screen, a touch control condition of a control in a picture of the display screen is a normal touch control, and a touch control condition of an area outside the control in the picture of the display screen is a mistaken touch.

When a user touches the display screen of the terminal equipment, hardware in the display screen will pick up a touch control position of the user, namely a position in a picture in the display screen, such as a coordinate position and the like. The picture of the display screen is provided with a control and a background, the control is a key for triggering operation, and the background is a position where operation cannot be triggered.

When a user normally uses the terminal equipment, the user generally operates a control in a picture in a display screen because an operation of the user is used for triggering a certain operation instead of simply touching the display screen; certainly, when a user normally uses the terminal equipment, the user also inevitably operates the background in the picture, and these operations may be mis-operation or mistaken touch. Based on the above using habits of the user, touch control operation on the display screen can be represented as normal operation of the user or unconscious mis-operation (such as operation of being in contact with the skin of the user in a clothes pocket) by using the mistaken touch rate, and when the display screen is subjected to the unconscious mis-operation, keys and the background in a picture are not distinguished, an area of the background is far larger than that of the keys, so that a probability that the background is touched is larger than that of the keys.

In one example, the mistaken touch rate of the display screen of the terminal equipment can be obtained within a preset duration, for example, the mistaken touch rate of the display screen of the terminal equipment is obtained within 30 s.

In another example, when a touch control frequency of the display screen reaches a preset frequency threshold value, the mistaken touch rate of the display screen of the terminal equipment can be obtained, for example, when the touch control frequency reaches 10, the mistaken touch rate of the display screen of the terminal equipment is obtained.

In the step S103, the camera shooting program is exited in response to the condition that the mistaken touch rate is larger than a preset first proportion threshold value.

It can be seen from analysis in the S102 that the mistaken touch rate can be used for representing whether the touch control operation is normal operation of the user or not. Therefore, a first proportion threshold value can be preset according to experience, when the mistaken touch rate is below the first proportion threshold value (including the first proportion threshold value), the touch control operation is considered as the normal operation of the user, and when the mistaken touch rate is above the first proportion threshold value, the touch control operation is considered as the non-normal operation of the user, for example, a touch control operation caused by being in contact with the skin of the user in a pocket of the user.

Therefore, under the condition that the mistaken touch rate is greater than the preset first proportion threshold value, it is considered that this entry into the camera shooting program from the screen locking state is caused by mistaken touch of a camera shooting program starting key in a screen locking interface, that is, a user does not start the camera shooting program, and the camera shooting program is exited.

In one example, after the camera shooting program is exited, the screen locking state can be restored, and images and videos collected after the terminal equipment enters the camera shooting program from the screen locking state are deleted. For example, the display screen is lighted up to present a screen locking interface or the display screen is always-on. The memory occupation of the terminal equipment can be avoided by deleting the mistakenly shot images and videos.

In another example, after exiting the camera shooting program, the screen locking state can be restored, and the starting key of the camera shooting program in the screen locking interface is closed, so that the starting key of the camera locking program can be prevented from being mistakenly touched again. When the terminal equipment is unlocked and enters the screen locking state again, the starting key of the camera shooting program in the screen locking interface can be restarted.

When the terminal equipment enters the camera shooting program from the screen locking state, the motion parameters collected by the at least one motion sensor are obtained, the motion state of the terminal equipment is determined according to the motion parameters collected by the at least one motion sensor, and when the motion state is the moving state, the mistaken touch rate of the display screen of the terminal equipment is obtained. When the mistaken touch rate is larger than the preset first proportion threshold value, the camera shooting program is exited. As a probability that the terminal equipment is used in the moving state process is extremely low, and the high mistaken touch rate is used for representing a situation that touch control operation is abnormal touch control operation, namely touch control operation in the non-normal use process of a user, after the terminal equipment enters the camera shooting program from the screen locking state, in combination with the judgment in the above two aspects, whether operation of entering the camera shooting program is normal operation or mis-operation can be accurately determined, and the camera shooting program is exited when the operation is determined to be mis-operation, so that the problem that the camera shooting program is mistakenly entered due to the fact that a camera shooting program starting key in a screen locking interface is mistakenly touched in a screen locking state is solved, which avoids taking photos or recording videos after mistakenly entering the camera shooting program, and greatly improving user experience and improving use safety in the screen locking state.

Figure 2:
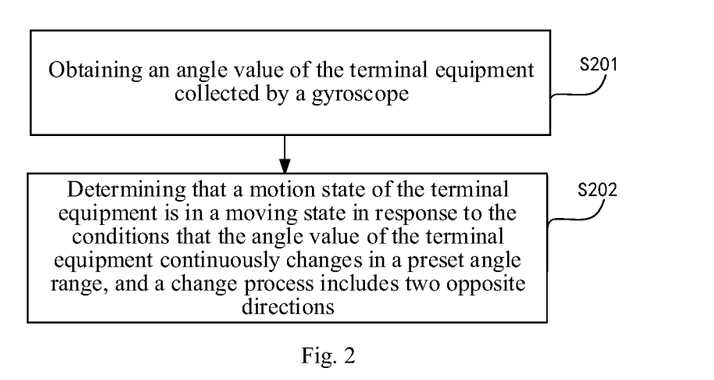
FIG. 2 is a flow chart of a mode of determining a motion state of terminal equipment shown in one illustrative example of the disclosure.

In some examples of the disclosure, according to a manner as shown in FIG. 2, motion parameters collected by at least one motion sensor can be obtained, and the motion state of the terminal equipment can be determined according to the motion parameters collected by the at least one motion sensor, including steps S201 to S202.

In step S201, an angle value of the terminal equipment collected by a gyroscope is obtained.

The gyroscope can collect the angle value of the terminal equipment in real time or according to a certain frequency, so that the angle value of the terminal equipment collected by the gyroscope can be obtained. The angle value of the terminal equipment can represent a posture of the terminal device, for example, the terminal equipment can be defined to be in a vertical state when the terminal equipment is at 0 degree, an angle after the terminal equipment inclines towards a direction where the display screen is located is a positive angle, and an angle after the terminal equipment inclines towards a direction opposite to the display screen is a negative angle.

In one example, after the angle value of the terminal equipment collected by the gyroscope is obtained, low-pass filtering can be performed on the angle value of the terminal equipment collected by the gyroscope, so that the influence of some wrong angles on a judgment result of a motion state is eliminated.

In step S202, it is determined that a motion state of the terminal equipment is in a moving state in response to the conditions that the angle value of the terminal equipment continuously changes in a preset angle range, and a change process includes two opposite directions.

The angle value continuously changes in the preset angle range and the change process includes two opposite directions, so that the terminal equipment can regularly move in a certain angle range, and the terminal equipment can be determined to be in a moving state under this condition. For example, when the terminal equipment moves along with the user in a pocket of the clothes of the user (for example, the user walks, runs and the like), the terminal equipment can reciprocate within the range of minus 10 degrees to plus 10 degrees according to the angle defined in step S201.

It needs to be noted that when the angle range of the reciprocating motion of the terminal equipment is small, the small-amplitude motion of the terminal equipment caused by some vibrations in a scene is possible, for example, the terminal equipment slightly reciprocates along with the vibration of an engine in the running process of a vehicle, for example, according to the angle defined in step S201, the terminal equipment can reciprocate within the range of minus 1 degree to plus 1 degree. Therefore, when the preset angle range is determined, the range needs to be larger than a certain angle threshold value, so that motion state misjudgment caused by slight motion can be eliminated.

Under the conditions that the angle value of the terminal equipment continuously changes in the preset angle range and the change process includes two opposite directions, a motion state of the terminal equipment is not directly determined to be in a moving state; instead, the motion state of the terminal equipment is further determined by using an acceleration value collected by an acceleration sensor according to the following mode: firstly, an acceleration value of the terminal equipment collected by an acceleration sensor is obtained; and, a horizontal movement speed of the terminal equipment is determined according to the acceleration value; and finally, in response to a situation that the horizontal movement speed of the terminal equipment is within a preset speed range, it is determined that the motion state of the terminal equipment is the moving state.

After the acceleration value of the terminal equipment collected by the acceleration sensor is obtained, low-pass filtering can also be performed on the acceleration value of the terminal equipment collected by the acceleration sensor, so that the influence of some wrong acceleration values on a judgment result of the motion state is eliminated.

The horizontal movement speed of the terminal equipment can be obtained by integrating the acceleration value. When the terminal equipment moves, the horizontal movement speed is within a certain range, so that whether the terminal equipment is in a moving state or not can be determined by presetting a speed range and further judging a relationship between the horizontal movement speed and the preset speed range. The preset speed range can be set between m/s and 50 m/s.

In this example, through further judgment of the acceleration value of the acceleration sensor, the determination accuracy of the motion state of the terminal equipment can be improved, and the gyroscope and the acceleration sensor are mutually matched and corrected, so that misjudgment of the motion state of the terminal equipment is avoided.

In some examples of the disclosure, before exiting the camera shooting program, whether entering the camera shooting program is caused by mistaken touch of a user can be further determined according to the following mode: firstly, a pixel value of each pixel in a viewing frame in the display screen is obtained; next, according to the pixel value of each pixel of a picture in the viewing frame, a blank screen ratio of the viewing frame is determined, where the blank screen ratio is a ratio of the number of pixels with a pixel value lower than a preset pixel threshold value to the number of all pixels. Based on this, when exiting the camera shooting program, the camera shooting program can be exited in response to the condition that the blank screen ratio is larger than a preset second proportion threshold value.

The picture in the viewing frame is a preview picture of a camera of the terminal equipment, namely a picture of an environment which the camera directly faces. If the terminal equipment is located in a closed space such as a pocket of a clothes of a user, the camera is closed, so that its preview picture is a pure black picture or a picture with low brightness (for example, a condition that a small amount of light penetrates into the pocket). When the terminal equipment is located in a closed space such as the pocket of the clothes of the user, the user often does not operate the terminal equipment, and the user does not shoot a pure black picture or a picture with low brightness with high probability even if the user switches to a camera shooting program, so that the preview picture which is a pure black picture or the picture with low brightness can be used for determination, and this entry into the camera shooting program is caused by the fact that a user mistakenly touches a camera shooting program starting key in a screen locking interface.

When the pixel value of each pixel of the picture in the viewing frame is obtained, R (red), G (green) and B (blue) values of the pixels can be respectively obtained, when the pixel value and a pixel threshold value are compared, the R value and the pixel threshold value, the G value and the pixel threshold value and the B value and the pixel threshold value can be respectively compared, and when the R value, the G value and the B value are all smaller than the pixel threshold value, it is determined that the pixel value is smaller than the pixel threshold value.

The pixel threshold value can be preset according to experience, and the pixels with a pixel value lower than the pixel threshold value is considered to be black pixels or pixels with low brightness. If the blank screen ratio is larger than a second proportion threshold value, the picture in the viewing frame is considered to be a black picture or a picture with low brightness, and the second proportion threshold value can be set to be 95% and the like.

In this example, the blank screen ratio of the picture in the viewing frame is determined, so that when the terminal equipment is in a closed space such as a clothes pocket, it can be determined that the camera shooting program is started due to the fact that a user mistakenly touches the camera shooting program starting key in the screen locking interface; therefore, the mistaken touch judgment accuracy of the camera shooting program starting key can be further improved.

In some examples of the disclosure, before exiting the camera shooting program, a prompt window is generated, where the prompt window is used for prompting a user that the camera shooting program is about to be exited; in response to a situation that a cancel instruction is received, the camera shooting program is maintained, where the cancel instruction is used for representing a situation that the camera shooting program is maintained. Based on this, when the camera shooting program is exited, the camera shooting program can be exited in response to the fact that a determination instruction is received and/or a duration of generating the prompt window exceeds a preset duration threshold value, where the determination instruction is used for representing a situation that it is determined that the camera shooting program is exited.

Prompt information such as whether to exit a camera shooting program or not can be contained in the prompt window, the prompt window is provided with a determination key and a cancel key, a determination instruction is generated when a user clicks the determination key, and a cancel instruction is generated when the user clicks the cancel key. When the user does not operate any key and the duration exceeds the preset duration threshold value, it can be determined that the user does not use the terminal equipment, and therefore it can be further determined that the user mistakenly touches the camera shooting program starting key in the screen locking interface, and the camera shooting program is exited.

In other words, after it is determined that this entry into the camera shooting program is caused by the fact that the user mistakenly touches the camera shooting program starting key in the screen locking interface, the operation of the user can be further obtained through the prompt window, the camera shooting program is further exited or maintained according to the operation of the user, and therefore the accuracy of exiting the camera shooting program is further improved.

Figure 3:
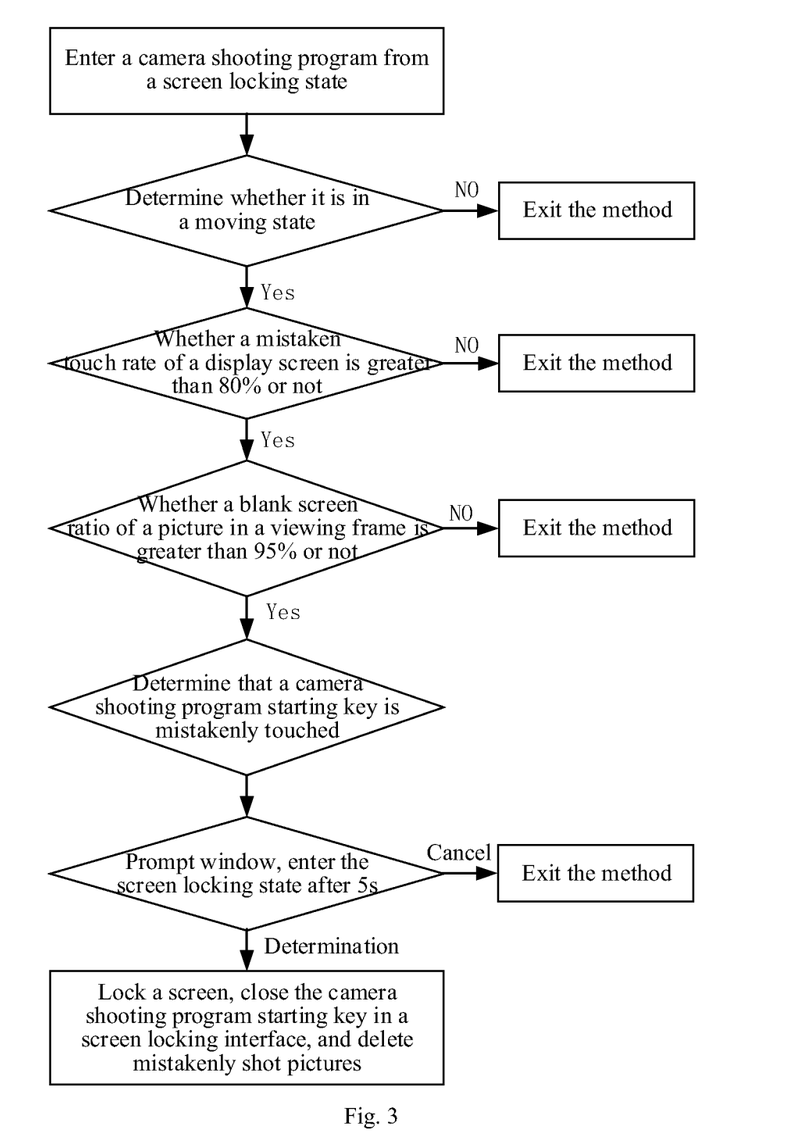
FIG. 3 is a process diagram of a camera shooting program control method shown in one illustrative example of the disclosure.

With reference to FIG. 3, a whole camera shooting program control process provided by one example of the disclosure is illustratively shown, it can be seen from the figure that after terminal equipment enters a camera shooting program from a screen locking state, whether the terminal equipment is in a moving state or not is determined firstly, if not, the camera shooting program control method is exited, and if yes, whether a mistaken touch rate of a display screen is greater than 80% or not is further determined, if not, the camera shooting program control method is exited, if yes, whether a blank screen ratio of a picture in a viewing frame is greater than 95% or not is further determined, and if not, the camera shooting program control method is exited; if yes, it is determined that a camera shooting program starting key in a screen locking interface is mistakenly touched to cause this entry into the camera shooting program, so that a prompt window is generated, and an operation instruction of a user is obtained, a screen locking state is entered if the user does not perform operation within 5 s, and the camera shooting program control method is exited if a cancel instruction is generated by the user through a cancel key, and if a determination instruction is generated by the user through a determination key, the screen locking state is entered, the camera shooting program starting key in the screen locking interface is closed, and mistakenly shot pictures (and videos) are deleted.

Figure 4:
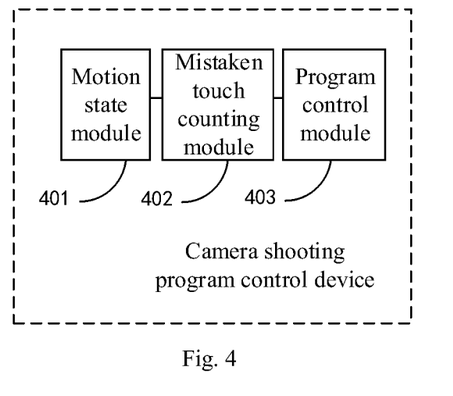
FIG. 4 is a structural schematic diagram of a camera shooting program control device shown in one illustrative example of the disclosure.

According to a second aspect of the examples of the disclosure, provided is a camera shooting program control device, the device is applied to terminal equipment. In FIG. 4, a structure of the device is shown, and the device includes:

a motion state module 401, configured to obtain motion parameters collected by at least one motion sensor in response to a situation that terminal equipment enters a camera shooting program from a screen locking state, and determine a motion state of the terminal equipment according to the motion parameters collected by the at least one motion sensor;

a mistaken touch counting module 402, configured to obtain a mistaken touch rate of a display screen of the terminal equipment in response to the fact that the motion state of the terminal equipment is a moving state, where the mistaken touch rate includes a proportion of a mistaken touch frequency of the display screen to a touch control frequency of the display screen, a touch control condition of a control in a picture of the display screen is a normal touch control, and a touch control condition of an area outside the control in the picture of the display screen is a mistaken touch; and a program control module 403, configured to exit the camera shooting program in response to the condition that the mistaken touch rate is greater than a preset first proportion threshold value.

In some examples of the disclosure, the motion state module is configured to:

obtain an angle value of the terminal equipment collected by a gyroscope; and determine that a motion state of the terminal equipment is in a moving state in response to the conditions that the angle value of the terminal equipment continuously changes in a preset angle range, and a change process includes two opposite directions.

In some examples of the disclosure, when being configured to determine that the motion state of the terminal equipment is in a moving state in response to the conditions that the angle value of the terminal equipment continuously changes in the preset angle range, and the change process includes two opposite directions, the motion state module is specifically configured to:

obtain an acceleration value of the terminal equipment collected by an acceleration sensor in response to the conditions that the angle value of the terminal equipment continuously changes in the preset angle range, and the change process includes two opposite directions;

determine a horizontal movement speed of the terminal equipment according to the acceleration value; and determine that the motion state of the terminal equipment is in the moving state in response to a situation that the horizontal movement speed of the terminal equipment is within a preset speed range.

In some examples of the disclosure, the motion state module is further configured to:

perform low-pass filtering on the angle value of the terminal equipment collected by the gyroscope; and/or, perform low-pass filtering on the acceleration value of the terminal equipment collected by the acceleration sensor.

In some examples of the disclosure, the mistaken touch counting module is specifically configured to:

obtain the mistaken touch rate of the display screen of the terminal equipment within a preset duration; and/or, obtain the mistaken touch rate of the display screen of the terminal equipment in response to the fact that the touch control frequency of the display screen reaches a preset frequency threshold value.

In some examples of the disclosure, the device further includes a pixel judgment module, configured to:

obtain a pixel value of each pixel in a viewing frame in the display screen before exiting the camera shooting program; and determine a blank screen ratio of the viewing frame according to the pixel value of each pixel of the picture in the viewing frame, where the blank screen ratio is a ratio of the number of pixels with a pixel value lower than a preset pixel threshold value to the number of all pixels;

the program control module is specifically configured to:

exit the camera shooting program in response to the condition that the blank screen ratio is greater than a preset second proportion threshold value.

In some examples of the disclosure, the device further includes a prompt module, configured to:

generate a prompt window before exiting the camera shooting program, where the prompt window is used for prompting a user that the camera shooting program is about to be exited;

maintain the camera shooting program in response to a situation that a cancel instruction is received, where the cancel instruction is used for representing a situation that the camera shooting program is maintained;

the program control module is specifically configured to:

exit the camera shooting program in response to the fact that a determination instruction is received and/or a duration of generating the prompt window exceeds a preset duration threshold value, where the determination instruction is used for representing a situation that it is determined that the camera shooting program is exited.

In some examples of the disclosure, the program control module is further configured to:

restore to the screen locking state, and delete images and videos collected after the terminal equipment enters the camera shooting program from the screen locking state.

In some examples of the disclosure, the program control module is further configured to:

restore to the screen locking state, and close a starting key of a camera shooting program in a screen locking interface.

According to the device in the above example, the specific mode for each module to execute operation has been described in detail in the examples of the method in the first aspect, and will not be described in detail here.

Figure 5:
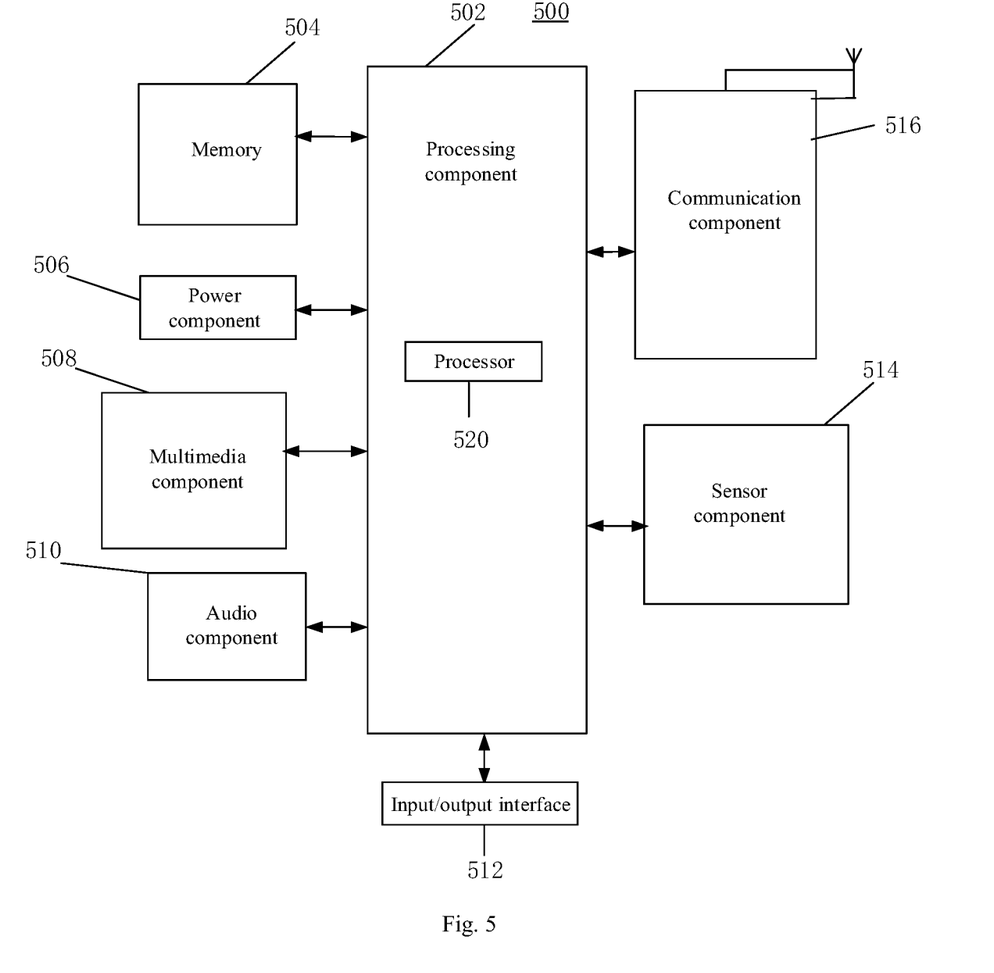
FIG. 5 is a block diagram of an electronic device shown in one illustrative example of the disclosure.

According to a third aspect of the examples of the disclosure, please refer to FIG. 5, a block diagram of an electronic device is illustratively shown. For example, a device 500 may be a mobile phone, a computer, a digital broadcast terminal, a messaging device, a game console, a tablet device, a medical device, a fitness device, a personal digital assistant, or the like.

With reference to FIG. 5, the device 500 may include one or more of the following components: a processing component 502, a memory 504, a power component 506, a multimedia component 508, an audio component 510, an input/ output (I/O) interface 512, a sensor component 514, and a communication component 516.

The processing component 502 typically controls overall operations of the device 500, such as operations associated with display, telephone calls, data communications, camera operations, and recording operations. The processing component 502 may include one or more processors 520 to execute instructions to complete all or part of the steps of the above method. Further, the processing component 502 may include one or more modules, facilitating interaction between the processing component 502 and other components. For example, the processing component 502 may include a multimedia module to facilitate interaction between the multimedia component 508 and the processing component 502.

The memory 504 is configured to store various types of data to support operation at the device 500. Examples of these data include instructions, contact data, phonebook data, messages, pictures, videos, etc. for any application or method operating on the device 500. The memory 504 may be implemented by any type of volatile or non-volatile storage device or a combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 506 provides power for various components of the device 500. The power component 506 may include a power management system, one or more power sources, and other components associated with generating, managing, and distributing power for the device 500.

The multimedia component 508 includes a screen arranged between the device 500 and a user and used for providing an output interface. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touches, slides, and gestures on the touch panel. The touch sensor may not only sense boundaries of a touch or slide action, but also detect duration and pressure associated with the touch or slide action. In some examples, the multimedia component 508 includes a front camera and/or a rear camera. When the device 500 is in an operation mode, such as a shooting mode or a video mode, the front camera and/or the rear camera can receive external multimedia data. Each front camera and each rear camera can be a fixed optical lens system or have focal length and optical zoom capability.

The audio component 510 is configured to output and/or input an audio signal. For example, the audio component 510 includes a microphone (MIC) configured to receive an external audio signal when the device 500 is in an operating mode, such as a call mode, a recording mode, and a speech recognition mode. The received audio signal may be further stored in the memory 504 or transmitted via the communication component 516. In some examples, the audio component 510 also includes a speaker for outputting the audio signal.

The I/O interface 512 provides an interface between the processing component 502 and a peripheral interface module, and the peripheral interface module may be a keyboard, a click wheel, a button and the like. These buttons may include, but are not limited to, a home button, a volume button, a start button, and a lock button.

The sensor component 514 includes one or more sensors for providing various aspects of state evaluation for the device 500. For example, the sensor component 514 may detect an on/off state of the device 500, relative positioning of the components, such as a display and a keypad of the device 500, and may also detect a change in position of the device 500 or one component of the device 500, the presence or absence of user contact with the device 500, the orientation or acceleration/deceleration of the device 500 and the temperature change of the device 500. The sensor component 514 may also include a proximity sensor configured to detect the presence of a nearby object without any physical contact. The sensor component 514 may also include a light sensor, such as a CMOS or CCD image sensor, for use in imaging applications. In some examples, the sensor component 514 may also include an acceleration sensor, a gyroscope sensor, a magnetic sensor, a pressure sensor, or a temperature sensor.

The communication component 516 is configured to facilitate wired or wireless communication between the device 500 and other devices. The device 500 may access a wireless network based on a communication standard, such as WiFi, 2G or 3G, 4G or 5G, or a combination. In one illustrative example, the communication component 516 receives broadcast signals or broadcast related information from an external broadcast management system via a broadcast channel. In one illustrative example, the communication component 516 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In illustrative examples, the device 500 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing a power supply method for the above electronic device.

In a fourth aspect, the disclosure also provides, in illustrative examples, a non-transitory computer-readable storage medium including instructions, such as a memory 504 including instructions executable by the processor 520 of the device 500 to complete the power supply method for the above electronic device. For example, the non-transitory computer-readable storage medium may be an ROM, a random access memory (RAM), a CD-ROM, a magnetic tape, a floppy disk, an optical data storage device, or the like.

Other examples of the disclosure will be readily conceived after taking into account the description and practicing the disclosure disclosed herein by those skilled in the art. The present application is directed to encompassing any variation, use or adaptive variation of the disclosure that follow the general principles of the disclosure and include the known common knowledge or habitual technical means in the art that are not disclosed by the disclosure. The description and examples are considered exemplary, and the true scope and spirit of the disclosure are indicated by the following claims.

It should be understood that the disclosure is not limited to the precise structures that have been described above and shown in the drawing, and that various modifications and changes can be made without departing from its scope. The scope of the disclosure is limited by the appended claims

What is claimed is:

1. A camera shooting program control method, wherein the method is applied to terminal equipment, and comprises:
   obtaining motion parameters collected by at least one motion sensor in response to a situation wherein the terminal equipment enters a camera shooting program from a screen locking state, and determining a motion state of the terminal equipment according to the motion parameters collected by the at least one motion sensor;
   obtaining a mistaken touch rate of a display screen of the terminal equipment in response to a motion state of the terminal equipment being a moving state, wherein the mistaken touch rate comprises a proportion of a mistaken touch frequency of the display screen to a touch control frequency of the display screen, a touch control condition of a control in a picture of the display screen is a normal touch control, and a touch control condition of an area outside the control in the picture of the display screen is a mistaken touch;
   exiting the camera shooting program in response to a condition wherein the mistaken touch rate is greater than a preset first proportion threshold value; and
   restoring to the screen locking state, and deleting images and videos collected after the terminal equipment enters the camera shooting program from the screen locking state after exiting the camera shooting program.

2. The camera shooting program control method according to claim 1, wherein obtaining the motion parameters collected by the at least one motion sensor, and determining the motion state of the terminal equipment according to the motion parameters collected by the at least one motion sensor comprise:
   obtaining an angle value of the terminal equipment collected by a gyroscope; and
   determining the motion state of the terminal equipment is in a moving state in response to the angle value of the terminal equipment continuously changing in a preset angle range, and an angle value change of the terminal equipment comprises two opposite directions.

3. The camera shooting program control method according to claim 2, wherein determining the motion state of the terminal equipment is in the moving state in response to the angle value of the terminal equipment continuously changing in the preset angle range, and an angle value change of the terminal equipment comprises two opposite directions comprises:
   obtaining an acceleration value of the terminal equipment collected by an acceleration sensor in response to the angle value of the terminal equipment continuously changing in the preset angle range, and an angle value change of the terminal equipment comprises two opposite directions;
   determining a horizontal movement speed of the terminal equipment according to the acceleration value; and
   determining the motion state of the terminal equipment is in the moving state in response to a situation the horizontal movement speed of the terminal equipment is within a preset speed range.

4. The camera shooting program control method according to claim 3, further comprising:
   performing low-pass filtering on the angle value of the terminal equipment collected by the gyroscope; or,
   performing low-pass filtering on the acceleration value of the terminal equipment collected by the acceleration sensor.

5. The camera shooting program control method according to claim 1, wherein obtaining the mistaken touch rate of the display screen of the terminal equipment comprises:
   obtaining the mistaken touch rate of the display screen of the terminal equipment within a preset duration; or,
   obtaining the mistaken touch rate of the display screen of the terminal equipment in response to the touch control frequency of the display screen reaching a preset frequency threshold value.

6. The camera shooting program control method according to claim 1, wherein before exiting the camera shooting program, the method further comprises:
   obtaining a pixel value of each pixel of a picture in a viewing frame in the display screen; and
   determining a blank screen ratio of the viewing frame according to the pixel value of each pixel of the picture in the viewing frame, wherein the blank screen ratio is a ratio of number of pixels with a pixel value lower than a preset pixel threshold value to number of all pixels;
   exiting the camera shooting program comprises:
   exiting the camera shooting program in response to the condition the blank screen ratio is greater than a preset second proportion threshold value.

7. The camera shooting program control method according to claim 1, wherein before exiting the camera shooting program, the method further comprises:
   generating a prompt window, wherein the prompt window is used for prompting a user that the camera shooting program is about to be exited; and
   maintaining the camera shooting program in response to a situation wherein a cancel instruction is received, wherein the cancel instruction is used for representing a situation wherein the camera shooting program is maintained;
   exiting the camera shooting program comprises:
   exiting the camera shooting program in response to a determination instruction being received or a duration of generating the prompt window exceeding a preset duration threshold value, wherein the determination instruction is used to characterize determination to exit the camera shooting program.

8. The camera shooting program control method according to claim 1, wherein after exiting the camera shooting program, the method further comprises:
   restoring to the screen locking state, and closing a starting key of a camera shooting program in a screen locking interface.

9. An electronic device, comprising a memory and a processor, wherein the memory is configured to store computer instructions capable of running on the processor, and the processor is configured to:
   obtain motion parameters collected by at least one motion sensor in response to terminal equipment entering a camera shooting program from a screen locking state, and determine a motion state of the terminal equipment according to the motion parameters collected by the at least one motion sensor;
   obtain a mistaken touch rate of a display screen of the terminal equipment in response to a motion state of the terminal equipment being a moving state, wherein the mistaken touch rate comprises a proportion of a mistaken touch frequency of the display screen to a touch control frequency of the display screen, a touch control condition of a control in a picture of the display screen is a normal touch control, and a touch control condition of an area outside the control in the picture of the display screen is a mistaken touch;
exit the camera shooting program in response to a condition the mistaken touch rate being greater than a preset first proportion threshold value; and
restore to the screen locking state, and delete images and videos collected after the terminal equipment enters the camera shooting program from the screen locking state after exiting the camera shooting program.

10. The electronic device according to claim 9, wherein the processor is configured to:
obtain an angle value of the terminal equipment collected by a gyroscope; and
determine the motion state of the terminal equipment is in a moving state in response to the angle value of the terminal equipment continuously changing in a preset angle range, and an angle value change of the terminal equipment comprises two opposite directions.

11. The electronic device according to claim 10, wherein the processor is configured to:
obtain an acceleration value of the terminal equipment collected by an acceleration sensor in response to the angle value of the terminal equipment continuously changing in the preset angle range, and an angel value change of the terminal equipment comprises two opposite directions;
determine a horizontal movement speed of the terminal equipment according to the acceleration value; and
determine the motion state of the terminal equipment is in the moving state in response to a situation the horizontal movement speed of the terminal equipment is within a preset speed range.

12. The electronic device according to claim 11, wherein the processor is further configured to:
perform low-pass filtering on the angle value of the terminal equipment collected by the gyroscope; or,
perform low-pass filtering on the acceleration value of the terminal equipment collected by the acceleration sensor.

13. The electronic device according to claim 9, wherein the processor is configured to:
obtain the mistaken touch rate of the display screen of the terminal equipment within a preset duration; or,
obtain the mistaken touch rate of the display screen of the terminal equipment in response to the touch control frequency of the display screen reaching a preset frequency threshold value.

14. The electronic device according to claim 9, wherein the processor is further configured to:
obtain a pixel value of each pixel of a picture in a viewing frame in the display screen before exiting the camera shooting program; and
determine a blank screen ratio of the viewing frame according to the pixel value of each pixel of the picture in the viewing frame, wherein the blank screen ratio is a ratio of number of pixels with a pixel value lower than a preset pixel threshold value to number of all pixels;
exit the camera shooting program comprises:
exit the camera shooting program in response to the condition the blank screen ratio is greater than a preset second proportion threshold value.

15. The electronic device according to claim 9, wherein the processor is further configured to:
generate a prompt window, wherein the prompt window is used for prompting a user that the camera shooting program is about to be exited before exiting the camera shooting program; and
maintain the camera shooting program in response to a situation wherein a cancel instruction is received, wherein the cancel instruction is used for representing a situation wherein the camera shooting program is maintained;
exit the camera shooting program comprises:
exit the camera shooting program in response to a determination instruction being received or a duration of generating the prompt window exceeding a preset duration threshold value, wherein the determination instruction is used to characterize determination to exit the camera shooting program.

16. The electronic device according to claim 9, wherein the processor is further configured to:
restore to the screen locking state, and close a starting key of a camera shooting program in a screen locking interface after exiting the camera shooting program.

17. A non-transitory computer readable storage medium having a computer program stored thereon, wherein when the program is executed by a processor, a camera shooting program control method is implemented, and the method comprises:
obtaining motion parameters collected by at least one motion sensor in response to terminal equipment entering a camera shooting program from a screen locking state, and determining a motion state of the terminal equipment according to the motion parameters collected by the at least one motion sensor;
obtaining a mistaken touch rate of a display screen of the terminal equipment in response to a motion state of the terminal equipment being a moving state, wherein the mistaken touch rate comprises a proportion of a mistaken touch frequency of the display screen to a touch control frequency of the display screen, a touch control condition of a control in a picture of the display screen is a normal touch control, and a touch control condition of an area outside the control in the picture of the display screen is a mistaken touch;
exiting the camera shooting program in response to a condition the mistaken touch rate being greater than a preset first proportion threshold value; and
restoring to the screen locking state, and deleting images and videos collected after the terminal equipment enters the camera shooting program from the screen locking state after exiting the camera shooting program.

* * * * *

UNITED STATES PATENT AND TRADEMARK OFFICE
CERTIFICATE OF CORRECTION

| | | |
|---|---|---|
| PATENT NO. | : 11,831,984 B2 | |
| APPLICATION NO. | : 17/702539 | |
| DATED | : November 28, 2023 | |
| INVENTOR(S) | : Yongkang Fan et al. | |

It is certified that error appears in the above-identified patent and that said Letters Patent is hereby corrected as shown below:

In the Claims

In Column 15, Line 25, in Claim 11, delete "angel" and insert -- angle --, therefor.

Signed and Sealed this
Twenty-sixth Day of March, 2024

Katherine Kelly Vidal
Director of the United States Patent and Trademark Office